July 11, 1967  G. B. RICHARDS  3,330,157
LIQUID TRANSMISSION SYSTEM
Filed Aug. 11, 1964  3 Sheets-Sheet 1
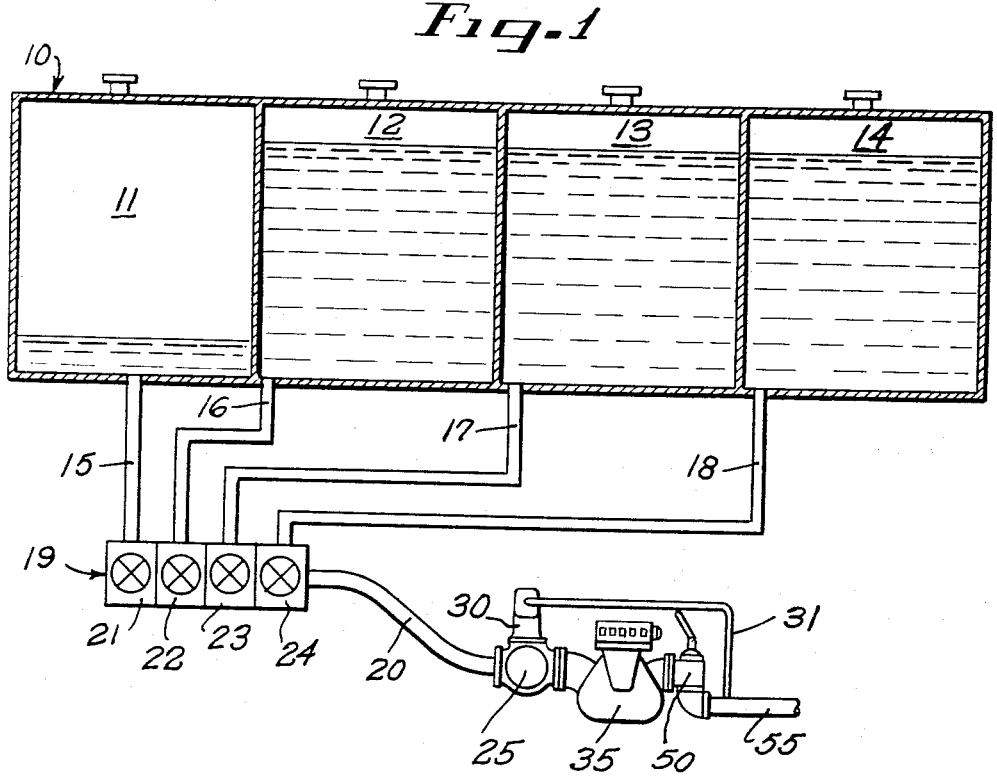
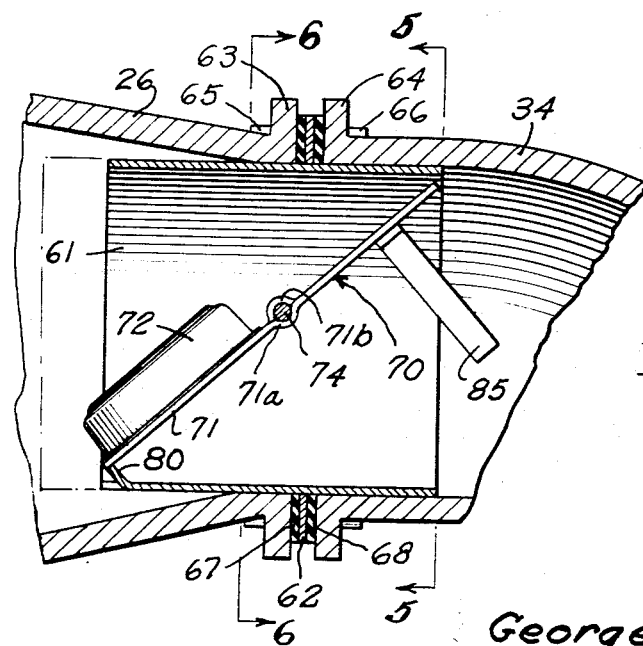
INVENTOR.
George B. Richards
BY
Fidler, Bradley & Patnaude
ATTORNEYS

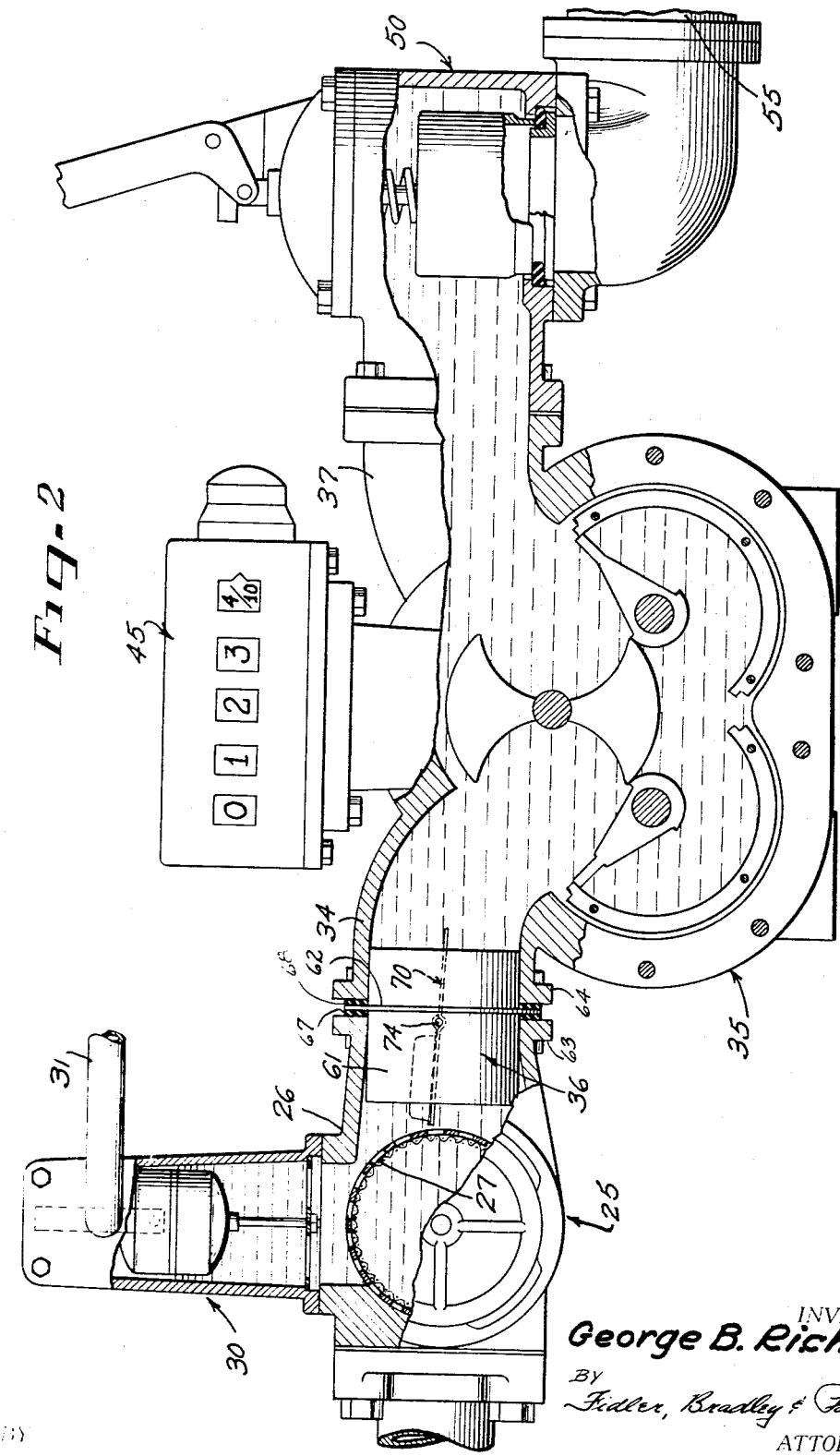

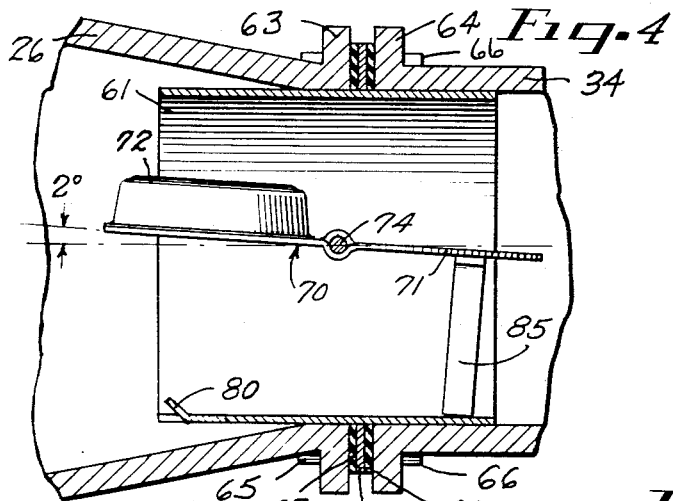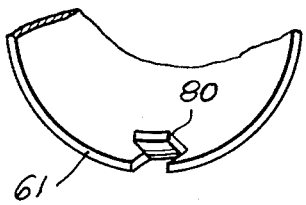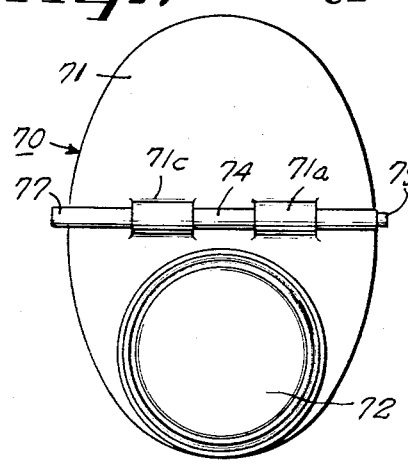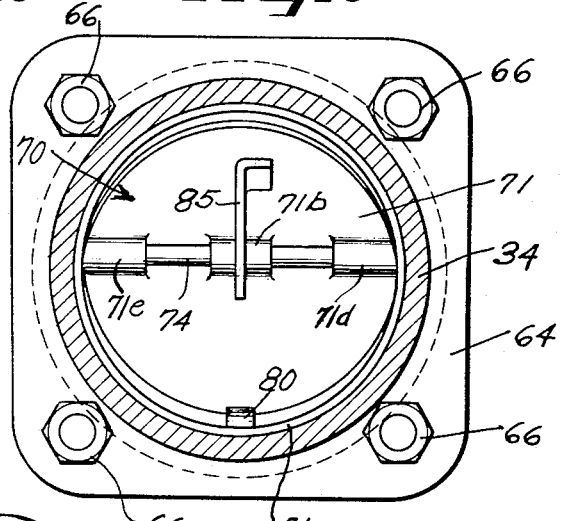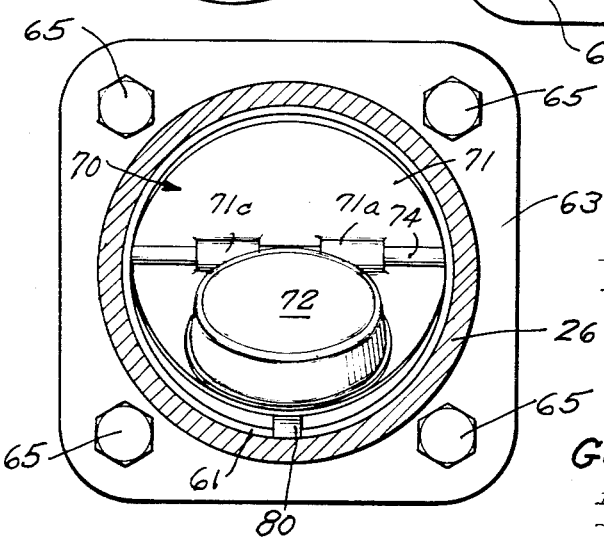

United States Patent Office 3,330,157
Patented July 11, 1967

3,330,157
LIQUID TRANSMISSION SYSTEM
George B. Richards, Lake Forest, Ill., assignor to Liquid Controls Corporation, North Chicago, Ill., a corporation of Illinois
Filed Aug. 11, 1964, Ser. No. 388,835
11 Claims. (Cl. 73—200)

This application is a continuation-in-part of an original application filed by George B. Richards on May 27, 1963, Serial No. 283,304, now abandoned, which application is assigned to the same assignee as is the present application.

The present invention broadly relates to a liquid transmission system, and it relates more particularly to new and improved fluid separation means suitable for preventing entrained air or other gaseous fluid from passing through a meter connected in a relatively low pressure system. The fluid separator of the present invention includes an air eliminator and a novel check valve connected in the line with the meter for limiting the rate of liquid flow in the line to a value at which the air eliminator is capable of exhausting the gas from the system.

The system of the present invention has many different applications but it is particularly suited for use in delivering measured quantities of liquids, such as petroleum products, from tank trucks. Such trucks normally have several separate compartments which may respectively contain different products which are delivered to several customers. Since the customers are supplied from a single load, a volumetric meter is ordinarily employed for measuring the amount of liquid delivered to each customer. In order to insure an accurate measurement by such a meter, it is common practice to employ an air eliminator for preventing air or other gaseous fluid entrained in the liquid from passing through the meter. These air eliminators are designed to operate most efficiently when a normal, relatively small amount of air is entrained in the liquid. Periodically, however, as, for example, where a tank compartment is nearly empty or one compartment has been emptied and another compartment is first opened, substantially greater amounts of air are drawn into the system. Inasmuch as size, weight and cost are controlling factors, it is not practical to design the air eliminators to function efficiently under these infrequently encountered conditions. Therefore, check valves have been employed for interrupting the flow of liquid whenever an excessive amount of air gets into the system.

The most common of these prior art type check valves employs an auxiliary float chamber and a float connected by a suitable linkage to a valve element in the line. This type of valve is not only bulky and relatively expensive but the necessarily large float chamber causes contamination or mixing of different liquids when two different liquid products are successively delivered by the system. Moreover, this type of check valve is sluggish and will at times pass undesirably large amounts of air to the meter causing an erroneous measurement.

An alternative type of prior art check valve is responsive to the pressure of the air or gas discharged from the air eliminator. In order to function properly this type of check valve requires a substantial fluid pressure and thus cannot be used where the line pressure is very low as is the case, for example, when the line is discharging under a low, gravity head.

Therefore, one object of the present invention is to provide a new and improved liquid transmission system.

Another object of the present invention is to provide new and improved means for eliminating air or other gaseous fluid from a liquid transmission system.

Still another object of the present invention is to provide a new and improved check valve for operation in connection with an air eliminator to limit the flow of liquid to a rate at which entrained gas can be removed from the system by the air eliminator.

A further object of the present invention is to provide a new and improved check valve for limiting the rate of flow in a liquid transmission system when the liquid passing therethrough contains more than a predetermined amount of air or other gaseous fluid.

A still further object of the present invention is to provide a fast acting check valve which is simple and compact in construction, light in weight, efficient in operation, and does not employ an auxiliary chamber of substantial size but may be installed directly in a section of an associated transmission line.

Briefly, the above and further objects are realized in accordance with the present invention by providing, on the downstream side of the air eliminator, a check valve incorporating a valve element which is held open by the pressure differential created by the flow of liquid thereacross. Upon the occurrence of a turbulent condition, i.e., when an excessive amount of air or gas becomes entrained in the liquid passing through the check valve, the valve element flutters. This fluttering causes the valve element to move into an unstable position and it is then rapidly closed by the pressure differential developed across it. When closed, the check valve passes liquid at an appreciably reduced rate whereby the air eliminator is capable of exhausting the gaseous fluid from the liquid before it reaches the meter. Moreover, any negative head on the downstream side of the check valve is broken by the air eliminator to permit the float to reopen the check valve element.

Other objects and advantages and a better understanding of the present invention will appear from the following detailed description taken in connection with the accompanying drawings, wherein:

FIG. 1 is a diagrammatic view of a liquid transmission system embodying the present invention;

FIG. 2 is an enlarged sectional view of a portion of the system of FIGURE 1 with certain parts thereof broken away;

FIGURE 3 is an enlarged, sectional view of a portion of the system of FIGURE 1 showing in detail a float actuated check valve, in a closed position, embodying the present invention;

FIGURE 4 is a view similar to FIGURE 3 but showing the check valve in an open position;

FIGURE 5 is a sectional view taken along the line 5—5 of FIGURE 3, assuming the entire check valve to be shown therein;

FIGURE 6 is a sectional view taken along the line 6—6 of FIGURE 3, assuming the entire check valve to be shown therein;

FIGURE 7 is a face view of the valve element; and

FIGURE 8 is a fragmentary view of the lower part of the valve seat element as seen from the left-hand side of FIGURE 4.

Referring now to the drawings and particularly to FIGURE 1, there is shown by way of illustration at tank 10 which may be stationary or may form a part of a tank truck (not shown). As is customary, the tank 10 includes a plurality of separate compartments 11, 12, 13, and 14, respectively connected by a plurality of conduits 15, 16, 17, and 18 to a valve manifold 19 including a plurality of valves 21, 22, 23, and 24.

Leading downstream from the valve manifold 19 is a conduit 20 to which is connected a strainer 25. The strainer 25 is of conventional construction and, as best shown in FIGURE 2, includes a casing 26 having therein a cylindrical strainer element including a mesh basket 27 through which the liquid flows in passing through the casing 26.

Mounted on top of the casing 26 is fluid separator or air eliminator 30, the interior of which communicates with the interior of the casing 20 to permit both liquid and gaseous fluid to enter the air eliminator from the casing 26. The air eliminator 30 may be of any suitable construction, such as, for example, the construction disclosed in United States Patent No. 3,021,861 issued February 20, 1962 to Henry Robert Billeter and George B. Richards. The air eliminator 30 serves to remove from the liquid passing through the system any gaseous fluid whereby the gas does not pass through a meter connected downstream thereof. A discharge conduit or pipe 31 leads from the discharge port of the fluid separator 30 and is connected to the system on the downstream side of the meter.

Connected to the outlet of the strainer casing 26 is the inlet portion 34 of a positive displacement volumetric meter 35 which may, for example, be similar to the meter disclosed in United States Patent 2,835,229 issued May 20, 1958 to George B. Richards. The meter 35 serves to measure the volume of fluid passed through the meter. Since the product being delivered is a liquid, it is imperative that gas be prevented from passing through the meter 35 with the consequent false reading.

A float actuated check valve 36, hereinafter described in greater detail, is operatively positioned in the line between the strainer casing 26 and the inlet 34 of the meter 35.

A counter and register 45 is mounted in a suitable manner on top of the meter 35 for the purpose of counting the revolutions of the meter and thereby registering the volume of liquid passed through the meter.

A faucet valve 50 is connected to the outlet 37 of the meter 35 for controllably interrupting the flow of fluid through the system and may take any suitable form. The valve 50 may, for example, be similar to the valve disclosed in United States Patent No. 2,955,797 issued October 11, 1960, to Henry R. Billeter and George B. Richards. The valve 50 may be operated manually or it may be operated automatically by a pre-set counter in a manner similar to that disclosed in United States Patent No. 3,057,553 issued October 9, 1962, to Henry R. Billeter.

Connected to and leading from the casing of the valve 50 is a discharge conduit 55 to which is connected, as best shown in FIGURE 1, the discharge end of the conduit 31 leading from the air eliminator casing.

Referring now particularly to FIGURES 3 to 7, the check valve 36 includes a generally tubular valve housing 61 of hollow, cylindrical form. The casing and the other members forming the valve 36 are preferably formed of a metal or other material which is inert to the fluids with which the valve is to be used. Inasmuch as the valve 36 is completely enclosed and is subjected to only negligibly small stresses, the valve casing 61 may be made very thin and thus occupies only a minimum of space within the members in which it is installed, namely, the strainer housing 26 and the meter inlet 34. By way of example, in one practical embodiment of the valve 35 the casing 61 was 1/16 of an inch in thickness.

Extending peripherally around the central portion of the casing 61 and projecting laterally therefrom is an annular flange 62 which is sealably secured to the main body of the casing 61 by suitable means such as brazing. The flange 62 is clamped between the flange 63 on the casing 26 and the flange 64 on the meter inlet 34. Preferably, a pair of annular gaskets 67 and 68 formed of suitable sealing material such, for example, as a synthetic plastic or rubber are interposed between the flange 62 and the flanges 63 and 64, respectively. A plurality of bolts 65 extend through aligned apertures in the flanges 63 and 64 and are retained by nuts 66 threaded on the bolts 65 to hold the valve casing 61 in place.

The orientation of the casing 61 in the conduit sections must remain fixed and is maintained by clamping the flange 62 tightly between the flanges 63 and 64. To this end the flange 62 may be of such diameter that it snugly fits against the sides of the bolts 65 which retain the conduit sections together, thus preventing annular displacement of the casing 61 within the conduit sections 21 and 34. However, where rotation of the casing 61 presents a problem, an alternative construction where the bolts 65 may extend through holes provided in the flange 62 in registry with the bolt holes in the flanges 63 and 64 may be used.

In order to control the rate of flow and prevent the passage of air through the meter 35, a valve element 70 is pivotally mounted in the casing 61. The element 70 includes a flat plate 71 of elliptical form having a cup-shaped member 72 secured to the upper face of the leading side of the plate 71 in liquid tight relation to define therewith a hollow float chamber containing air or other gaseous material.

It will be understood that a float is thus provided on the leading portion on the plate 71. The float may be formed in other ways than that shown in the drawings and described above if desired. For example, it may be formed by a suitable solid material which is lighter than the liquid to be handled by the system.

The valve element 70 is pivotally supported in the casing 61 by means of a horizontally disposed shaft 74 for oscillation between open and closed positions relative to the casing about a horizontal axis extending transversely of the casing 61 and of the valve element 70. The valve element 70 may be secured to the shaft 74 in any suitable manner and in the illustrated embodiment of the invention the shaft 74 extends through a hole formed by a plurality of pressed out U-shaped portions 71a, 71b, 71c, 71d, and 71e on the plate 71.

The shaft 74 is pivotally supported at one end in the casing 61 by a circular end portion or trunnion 77 journalled in a suitable opening of similar size in the casing 61. At the other end, the shaft is journalled in the casing 61 by a cylindrical section 79 of reduced diameter journalled in a circular opening of corresponding size in the casing 61. Thus it will be seen that the shaft 74 carrying the valve plate 71 can be inserted in the casing 61 with the reduced end 79 first inserted in the associated opening whereafter the end 77 is snapped in its corresponding opening.

The shaft 74 is so supported in the casing 61 that the valve element 70 can rock between a closed position as shown in FIG. 3 wherein the valve element appreciably closes the passage through casing 61 and an open position as shown in FIGURE 4. In this connection, it will be seen that a tab 80 is struck up from the forward leading edge of the casing 61 to determine the closed position of the valve element 70. By adjustably bending the tab 80 upwardly the closed position flow rate for a given pressure differential can be adjustably increased.

The open position of the valve element 70 is determined by a leg 85 suitably secured as by welding to the lower surface of the plate 71 on the trailing side thereof. It will be seen from FIGURES 3 and 4 that the pivotal axis of the valve element 70 is between the float and the leg 85. Due to the fact that the float member 72 is heavier than the leg 85, the valve element 70 is biased by gravity towards the closed position when the valve chamber is filled wih gas. On the other hand, when the casing 61 is filled with liquid, an upward force is exerted on the float to rock the valve element 70 on its pivot axis into the open position with the leg 85 engaging the casing 61.

The leading side of the valve element 70, i.e., the portion disposed upstream of the shaft 74 has a greater effective surface area than the trailing or downstream edge. Thus, with the length of the leg 85 such as to position the valve member 70 with a small angle of attack, such, for example, as two degrees, an air foil effect is realized which exerts a clockwise force couple (FIGURE 3) on the member 70 holding the valve open. Moreover, the pressure differential in the line across the valve element 70 also urges it clockwise to the fully open position. Accordingly, under normal operating conditions the valve 36 remains open as liquid flows therethrough.

When only approximately twenty-five gallons of the liquid product remains in the particular compartment 11–14 being emptied, the vortex formed therein causes a certain amount of air to become entrained in the liquid. If this amount of air exceeds that which can be handled by the air eliminator at the high rate of flow, some of the air reaches the check valve 36. The smooth flow of liquid over the surfaces of the valve member 70 is interrupted by the turbulent condition caused by the entrained air. Instability takes place and the valve element 70 commences to flutter. When the amplitude of this flutter movement exceeds the two degree angle of attack of the valve element 70 and the angle of attack becomes negative, the fluid generated pressures exerted thereon are reversed to the counterclockwise direction and the valve 36 abruptly closes. At this same time the air eliminator has opened and destroys any negative head existing downstream of the valve 36. Accordingly, the pressure across the valve 36 is substantially equalized except for the small head of liquid remaining in the compartment, the manifold 19 and in the associated line whereby the force exerted by the float is sufficient to automatically reopen the valve 36 thereby permitting the tank compartment to be quickly drained without feeding any substantial amount of air through the meter 35.

It will be understood that the fluid generated forces operating on the valve element 70 are substantially greater than the forces of gravity acting thereon. In fact, the dynamic forces are so much the greater as to make the static forces negligible when the valve 36 is open and liquid is flowing through the casing 61. Moreover, since the area of the plate 71 forward or upstream of the shaft 74 is greater than the area of the plate 71 rearward or downstream of the shaft 74, the kinetic forces generated by the flow and pressure of the fluid in the normal direction through the valve 36 urge the valve member 70 toward an open position when the leading edge thereof is above the horizontal plane but toward a closed position when the leading edge thereof is below the horizontal plane.

As alluded to hereinabove, an angle of attack of two degrees has been found to be optimum under certain conditions. When in such system an excessive air entrainment condition occurred, the valve 36 quickly closed and yet there was no hunting under normal operation. It will be understood by those skilled in the art, however, that lesser or greater angles of attack may be preferable under different operating conditions.

Consider now a typical operation of the system illustrated in FIGURE 1. When one of the valves 11–14 is opened with a dry manifold, the float element 70 will be in a closed position and will retain in such position. In order to open the valve 36, the valve 50 should be held closed until the liquid fills the conduit section 20, the strainer 25, the meter 35 and the casing 61 of the valve 36. When the casing 61 has thus filled with liquid, the float pivots the valve element 70 into the open position. In a practical embodiment of the present invention used on a gasoline tank truck, this operation takes less than one second. The valve 50 may then be opened to initiate delivery of the product.

It will be seen that the casing 61 of the valve 36 is of cylindrical form and of relatively short length and, therefore, is well adapted to be inserted in two adjoining conduit sections such as pipe sections or portions of housings such, for example, as the strainer casing and the meter casing. The casing 61 is retained between the two adjacent conduit sections by clamping the peripheral flange therebetween. Accordingly, the valve may be readily installed in two adjacent conduit sections of any one of a large number of liquid transmission systems without necessitating any alternation in the element of the system.

I claim:
1. In a fluid transmission system, the combination of
an air eliminator,
a meter connected in said system downstream of said air eliminator,
a cut-off valve connected in said system downstream of said meter, and
check valve means connected between said air eliminator and said meter and responsive to a turbulent flow of fluid in said system, said check valve comprising
a casing defining a cylindrical valve chamber having an inlet and an outlet,
an elliptical valve element having a minor axis substantially equal to the diameter of said valve chamber and a major axis longer than the diameter of said valve casing, and
means supporting said valve element for pivotal movement in said chamber about a pivot axis passing through and transversely to the line of fluid flow through said chamber and parallel to the minor axis of said valve element for movement between a closed position extending transversely to said line of flow and an open position extending generally in the direction of said line of flow, said valve element having a projected area upstream of said pivot axis greater than the projected area downstream of said axis.
2. In a fluid transmission system, the combination of
an air eliminator,
a meter connected in said system downstream of said air eliminator,
a cut-off valve connected in said system downstream of said meter, and
check valve means connected between said air eliminator and said meter and responsive to a turbulent flow of fluid therethrough for attenuating the flow of fluid in said system,
said check valve comprising a casing having a valve chamber with an inlet and an outlet,
a valve element,
means supporting said valve element for swinging movement about an axis transversely of said valve chamber between a closed position extending transversely of said valve chamber and an open position extending in the direction of flow through said chamber,
said valve element extending on opposite sides of said axis, and
said valve element having means for causing said valve element to be more buoyant at its leading edge portion than at its trailing edge portion whereby it is urged open by gravity when it is immersed in a liquid.
3. A liquid transmission system comprising
an air eliminator,
a meter connected downstream of said air eliminator, and
a valve element connected between said air eliminator and said meter,
said valve element being responsive to turbulence in the flow of liquid thereby to move into a position for substantially attentuating the flow of fluid through said air eliminator whenever the turbulence in the forward flow of liquid past said valve element exceeds a predetermined amount.

4. The invention as set forth in claim 3 comprising gravity responsive means for biasing said check valve toward an open position when the pressure differential across said check valve is less than a predetermined value and liquid is present in said system.

5. The invention as set forth in claim 4 wherein said check valve includes a valve member which is pivotally mounted for movement between an open position and a partially closed position on an axis extending through the flow path of said liquid transverse to the direction of liquid flow.

6. A liquid transmission system comprising
an air eliminator,
a meter connected downstream of the air eliminator, and
check valve means responsive to turbulent flow of liquid downstream of said air eliminator for attenuating the flow of liquid in said system upon the occurrence of a turbulent flow condition through said valve,
said check valve comprising gravity responsive means for biasing said check valve toward an open position when the pressure differential across said check valve is less than a predetermined value and liquid is present in said system,
said check valve further including a valve member which is pivotally mounted for movement between an open position and a partially closed position on an axis extending through the flow path of said liquid transverse to the direction of liquid flow, wherein the area of said valve member forward of said axis is greater than the area of said valve rearward of said axis and when said valve is in said partially closed position the leading edge of said valve member is below the trailing edge of said valve member.

7. In a fluid transmission system, the combination of
an air eliminator,
a meter connected in said system downstream of said air eliminator,
a cut-off valve connected in said system downstream of said meter, and
a check valve means connected between said air eliminator and said meter and responsive to a turbulent flow of fluid in said system, said check valve comprising
a casing defining a cylindrical valve chamber having an inlet and an outlet,
an elliptical valve element having a minor axis substantially equal to the diameter of said valve chamber and a major axis longer than the diameter of said valve casing, and
means supporting said valve element for pivotal movement in said chamber about a pivot axis passing through and transversely to the line of fluid flow through said chamber and parallel to the minor axis of said valve element for movement between a closed position extending transversely to said line of flow and an open position extending generally in the direction of said line of flow, said valve element having a projected area upstream of said axis greater than the projected area thereof downstream of said axis, wherein
said check valve includes an air foil surface disposed in the path of flow of said liquid for detecting a condition of turbulent flow.

8. The invention as set forth in claim 7 further comprising
a stop for limiting the movement of said air foil surface such that said surface makes an angle of attack of about two degrees when said check valve is in the open position.

9. In a liquid transmission system, the combination of
an air eliminator,
check valve means disposed downstream of said air eliminator and including a valve element mounted in said system for pivotal movement between an open position and a partially closed position, the projected area of said valve element upstream of the pivotal axis thereof being greater than the projected area of said valve element downstream of said axis,
means for biasing said valve element into said open position when the pressure differential across said valve element is less than a predetermined value,
valve means connected in said system downstream of said check valve, and
a valve member connected in said system downstream of said air foil surface.

10. In a fluid transmission system, the combination of
an air eliminator,
a meter connected in said system downstream of said air eliminator,
a cut-off valve connected in said system downstream of said meter,
check valve means connected between said air eliminator and said meter and responsive to a turbulent flow of fluid therethrough for attenuating the flow of fluid in said system,
said check valve means comprises,
means defining a conduit having an inlet and an outlet for the transmission of said fluid,
a valve element pivotably mounted in said conduit for movement about an axis between a first position and a second position,
said valve element when in said first position having a positive angle of attack relative to the flow of fluid through said conduit from said inlet to said outlet,
the area of said element on the leading side of said axis exceeding the area thereof on the trailing side of said axis, and
means for biasing said valve element into said first position when the pressure differential across said valve element is less than a predetermined value.

11. In a fluid transmission system, the combination of
an air eliminator,
a meter connected in said system downstream of said air eliminator,
a cut-off valve connected in said system downstream of said meter,
check valve means connected between said air eliminator and said meter and responsive to a turbulent flow of fluid therethrough for attenuating the flow of fluid in said system,
said check valve means comprises,
means defining a conduit having an inlet and an outlet for the transmission of said fluid,
a valve element pivotably mounted in said conduit for movement about an axis between a first position and a second position,
said valve element when in said first position having a positive angle of attack relative to the flow of fluid through said conduit from said inlet to said outlet,
the area of said element on the leading side of said axis exceeding the area thereof on the trailing side of said axis,
means for biasing said valve element into said first position when the pressure differential across said valve element is less than a predetermined value,
said means for biasing is a float mounted on said element on the upstream side of said axis.

References Cited

UNITED STATES PATENTS

| | | | |
|---|---|---|---|
| 452,750 | 5/1891 | Drury | 137—527.8 X |
| 922,262 | 5/1909 | Clemens | 137—527.8 |

(Other references on following page)

UNITED STATES PATENTS

| | | | |
|---|---|---|---|
| 1,107,096 | 8/1914 | Mulloy | 137—527.8 |
| 1,566,238 | 12/1925 | Swendeman | 137—192 |
| 1,581,294 | 4/1926 | Russell | 137—192 |
| 1,707,942 | 4/1929 | Petit | 137—527.8 |
| 1,853,099 | 4/1932 | Trager et al. | 73—200 |
| 2,177,330 | 10/1939 | Pressler | 137—173 |
| 2,237,520 | 4/1941 | Brubaker et al. | 73—200 |
| 2,263,145 | 11/1941 | Smith | 73—200 X |
| 2,273,118 | 2/1942 | Langdon | 137—527.8 |
| 2,292,509 | 8/1942 | Carson | 137—173 |
| 2,411,261 | 11/1946 | Granberg | 73—200 |
| 2,750,955 | 6/1956 | Bredetscheider et al. | 137—527.8 X |
| 2,809,712 | 10/1957 | Muller | 73—200 X |
| 3,040,573 | 6/1962 | Berck | 73—200 |

RICHARD C. QUEISSER, *Primary Examiner.*

ALAN COHAN, E. D. GILHOOLY,
*Assistant Examiners.*